E. OSTENDORF.
AUTOMOBILE JACK.
APPLICATION FILED APR. 28, 1919.
1,327,060.
Patented Jan. 6, 1920.
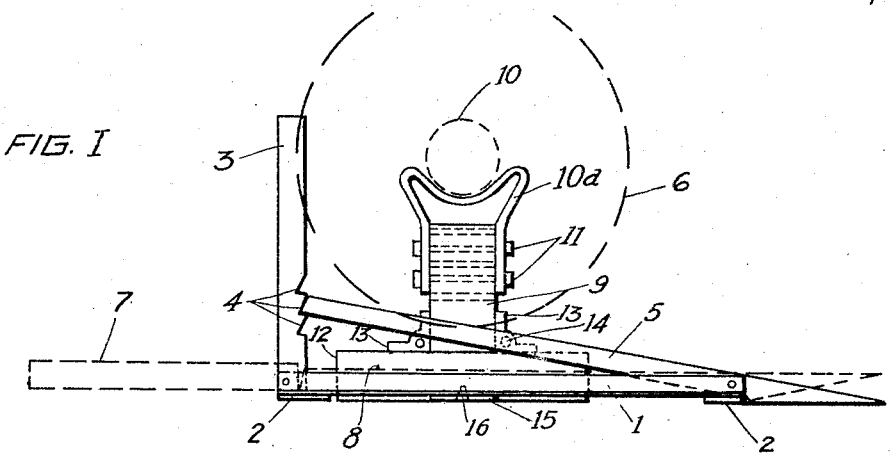
FIG. I
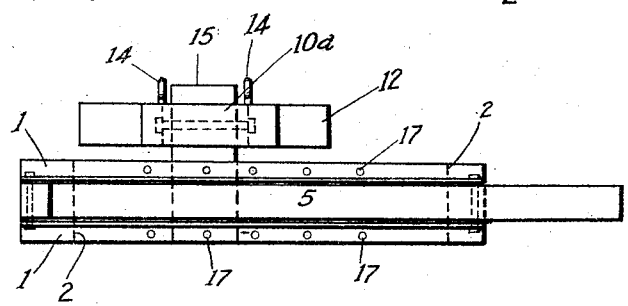
FIG. II
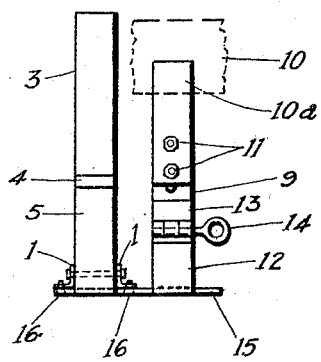
FIG. III
INVENTOR
EDWARD OSTENDORF
BY Goldberg
ATTORNEY

UNITED STATES PATENT OFFICE.

EDWARD OSTENDORF, OF PORTLAND, OREGON.

AUTOMOBILE-JACK.

1,327,060.  Specification of Letters Patent.  Patented Jan. 6, 1920.

Application filed April 28, 1919. Serial No. 293,165.

*To all whom it may concern:*

Be it known that I, EDWARD OSTENDORF, a citizen of the United States, and a resident of Portland, in the county of Multnomah and State of Oregon, have invented a new and useful Automobile-Jack, of which the following is a specification.

My invention relates to improvements in automobile jacks in which the wheel that needs jacking is driven on an inclined runway till the axle arrives over a supporting post, whereupon the runway collapses and leaves the axle with the wheel suspended on top of the supporting post.

The objects of my invention are, to furnish a mechanism which is simple in construction. light enough to be carried by an autoist in his machine, and finally which eliminates the tiresome and inconvenient way of crawling under the machine for the purpose of placing a jack under the axle.

I attain these objects with the mechanism illustrated in the accompanying drawing in which—

Figure I is a side elevation of the entire mechanism;

Fig. II is a plan view, and

Fig. III is an end elevation.

Similar numerals refer to similar parts throughout the several views.

Two horizontal and parallel pieces of angle iron 1 are connected at their ends by two base plates 2. Hinged between the angle irons are, at one end, the vertical post 3 with suitable serrations 4 and, at the other end, a runway 5 whose free end rests loosely in one of the serrations 4.

With such an arrangement it will be clear that an automobile wheel 6 which ascends the runway 5 and presses against the post 3 would throw the latter into the position 7 and, by disengaging the runway 5 from the serration 4, cause the former to drop to the position 8, which would naturally carry the wheel down too.

To intercept the wheel in its downward movement, there is placed at the side of the runway 5 a supporting post 9, designed to receive the axle 10 of the automobile wheel and to retain it in suspense.

This supporting post 9 is capped with a cradlelike strap $10^a$, partly to furnish a secure rest for the axle 10 and partly to permit, by means of bolts 11, a different adjustment in height to suit the various wheel sizes.

At the bottom the supporting post 9 is attached to a base block 12 by means of two hinges 13, the latter having removable hinge pins 14.

The base block 12 is connected to the angle irons 1 by means of a base plate 15, whose dowels 16 enter the corresponding holes 17 and thereby retain runway and supporting post in proper spacial relation; a choice of holes 17 being provided to permit the use of the same apparatus for wheels of different diameters.

After the runway has collapsed and the axle has come to rest on the supporting post, the angle iron frame may be lifted off the dowels and removed from the path of the automobile wheel.

To bring the wheel down to the ground, one of the hinge pins 14 is withdrawn and the vehicle, either by hand or under its own power, is moved in a direction which will cause the supporting post to rotate in the remaining hinge until the wheel is brought down.

The whole apparatus may then be stored in the automobile for future use.

Having thus described my invention, it will be seen that my objects have been accomplished and, though I have shown the preferred form of construction, I reserve to myself the right to make minor changes, providing I do not violate the spirit and principle of my invention.

I claim:

1. In an automobile jack, the combination of a rectangular, horizontal frame having a vertical post pivotally attached to one end, having an inclined runway pivoted to the other end, the free end of the runway being supported by the vertical post, said runway being capable of collapsing when an automobile wheel ascends and overturns the vertical post, with a supporting post attached to the side of the horizontal frame and adapted to receive the axle of said automobile wheel when the runway collapses.

2. In an automobile jack, the combination of a supporting post adapted to hold the axle of an automobile wheel, a base block under the supporting post, hinges with removable hinge pins between base block and supporting post adapted to permit forward or backward rotation to the latter, and a base plate under the base block, with a removable, inclined runway attached to said base plate and capable of collapsing when an ascending automobile wheel arrives with its axle over the supporting post.

EDWARD OSTENDORF.